United States Patent
Scarfone

(10) Patent No.: US 10,465,577 B2
(45) Date of Patent: Nov. 5, 2019

(54) FUEL SUPPLY DEVICE FOR ENGINE INJECTION AND EXHAUST-GAS AFTER TREATMENT

(71) Applicant: Robert Bosch GmbH, Stuttgart (DE)

(72) Inventor: Roberto Scarfone, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/752,961

(22) PCT Filed: Jun. 20, 2016

(86) PCT No.: PCT/EP2016/064153
§ 371 (c)(1),
(2) Date: Feb. 15, 2018

(87) PCT Pub. No.: WO2017/028996
PCT Pub. Date: Feb. 23, 2017

(65) Prior Publication Data
US 2018/0223710 A1    Aug. 9, 2018

(30) Foreign Application Priority Data

Aug. 18, 2015    (DE) .......................... 10 2015 215 685

(51) Int. Cl.
*F01N 3/02* (2006.01)
*F02M 37/00* (2006.01)
(Continued)

(52) U.S. Cl.
CPC .......... *F01N 3/0253* (2013.01); *F01N 9/002* (2013.01); *F02M 37/0047* (2013.01);
(Continued)

(58) Field of Classification Search
CPC .......... F01N 3/0253; F01N 3/02; F01N 9/002; F01N 9/00; F01N 2610/03;
(Continued)

(56) References Cited

U.S. PATENT DOCUMENTS

2009/0025685 A1*    1/2009    Einberger ............. F01N 3/0253
123/447

FOREIGN PATENT DOCUMENTS

| WO | 2007093554 | 8/2007 |
| WO | 2009071427 | 6/2009 |
| WO | 2014086518 | 6/2014 |

OTHER PUBLICATIONS

International Search Report for Application No. PCT/EP2016/064153 dated Aug. 31, 2016 (English Translation, 2 pages).

* cited by examiner

*Primary Examiner* — Laert Dounis
*Assistant Examiner* — Kelsey L Stanek
(74) *Attorney, Agent, or Firm* — Michael Best & Friedrich LLP

(57) ABSTRACT

A fuel supply device (2), in particular for use in a motor vehicle comprising an internal combustion engine (20), has a fuel supply pump (4) which is designed to remove fuel (28) from a fuel tank (6) and to release said fuel under increased pressure through an outlet; a first fluid connection (7) which is provided for connecting an exhaust line metering device (8) and; a second fluid connection (10) which is provided for connecting an engine injection device (12). The first fluid connection (7) is directly connected to the outlet of the fuel supply pump (4). A fluid choke (16) is arranged between the outlet of the fuel supply pump (4) and the second fluid connection (10). The invention enables an exhaust line metering device (8) and an engine injection device (12) to be operated reliably on a common fuel supply device (2).

10 Claims, 3 Drawing Sheets

(51) Int. Cl.
| | |
|---|---|
| *F01N 3/025* | (2006.01) |
| *F01N 9/00* | (2006.01) |
| *F02M 37/08* | (2006.01) |
| *F02M 37/22* | (2019.01) |

(52) U.S. Cl.
CPC ........ *F02M 37/0052* (2013.01); *F02M 37/08* (2013.01); *F02M 37/22* (2013.01); *F01N 2610/03* (2013.01); *F01N 2610/14* (2013.01); *F01N 2610/144* (2013.01); *F01N 2610/1433* (2013.01); *F01N 2610/1473* (2013.01); *F02M 2037/085* (2013.01); *Y02T 10/47* (2013.01)

(58) Field of Classification Search
CPC ......... F01N 2610/14; F01N 2610/1433; F01N 2610/144; F01N 2610/1473; F02M 37/0047; F02M 37/0052; F02M 37/08; F02M 37/22; Y02T 10/47
USPC .......................................................... 60/274
See application file for complete search history.

FUEL SUPPLY DEVICE FOR ENGINE INJECTION AND EXHAUST-GAS AFTER TREATMENT

BACKGROUND OF THE INVENTION

The invention relates to a fuel supply device, in particular a fuel supply device which is designed for supplying fuel to an exhaust-tract dosing apparatus and to an engine injection apparatus of a motor vehicle.

Owing to exhaust-gas legislation, motor vehicles with internal combustion engines, in particular diesel engines, generally have a diesel particle filter (DPF) in the exhaust tract of the internal combustion engine, which diesel particle filter is designed to filter out particles, in particular soot particles, contained in the exhaust gases.

From time to time, in particular when a high exhaust-gas back pressure caused by a high particle load of the diesel particle filter hinders the discharge of exhaust gas, it is necessary to regenerate the diesel particle filter. The regeneration is generally performed by burning off the particles stored in the particle filter. For this purpose, fuel is injected into the exhaust tract by a dosing apparatus that is arranged on the exhaust tract upstream of the particle filter. The combustion of the fuel in the exhaust tract, which is possibly assisted by an oxidation catalytic converter, generates the high temperatures necessary for burning off the particles stored in the particle filter.

To minimize the effects of pressure fluctuations in the dosing apparatus on the fuel quantity introduced into the exhaust tract, WO 2014/086518 A1 presents a dosing apparatus with a supply device and with a metering unit, wherein a variable throttle is arranged between the supply device and the metering unit.

The additional outlay required as a result of the provision of an exhaust-tract dosing apparatus can be kept low if the exhaust-tract dosing apparatus and the engine injection apparatus, which is provided for injecting fuel into the combustion chambers ("cylinders") of the internal combustion engine, are supplied from a common fuel supply device.

It is therefore desirable to provide a fuel supply device which is capable of reliably supplying fuel both to the exhaust-tract dosing apparatus and to the engine injection apparatus.

SUMMARY OF THE INVENTION

In one exemplary embodiment of the invention, a fuel supply device, which is provided in particular for use in a motor vehicle having an internal combustion engine, comprises a fuel delivery pump, which is designed to extract fuel from a tank and to output said fuel at elevated pressure through an outlet; a first fluid port, which is provided for the connection of an exhaust-tract dosing apparatus, and a second fluid port, which is provided for the connection of an engine injection apparatus. The first fluid port is connected to the outlet of the fuel delivery pump directly, or only via a fuel filter, such that the fluid pressure at the first fluid port is, aside from a pressure drop across the fuel filter that is possibly arranged between the outlet of the fuel delivery pump and the first fluid port, identical to the fluid pressure at the outlet of the fuel delivery pump. A fluid throttle is arranged between the outlet of the fuel delivery pump and the second fluid port, such that the fluid pressure at the second fluid port is lower than the fluid pressure at the outlet of the fuel delivery pump and at the first fluid port.

In a method according to the invention for operating an internal combustion engine having a fuel supply device according to an exemplary embodiment of the invention and having an engine injection apparatus which is connected to the second fluid port and which is designed to inject fuel into at least one combustion chamber of an internal combustion engine, the delivery quantity of the fuel delivery pump is set such that the engine injection apparatus is provided with a sufficient fuel quantity. For efficient operation, the delivery quantity is in particular set such that the fuel quantity provided by the fuel supply device is not significantly greater than the fuel quantity required by the engine injection apparatus.

In a method according to the invention for regenerating a particle filter, having a fuel supply device according to an exemplary embodiment of the invention, and an exhaust-tract dosing apparatus which is connected to the first fluid port and which is designed to inject fuel, which is provided by the fuel supply device, upstream of the particle filter into the exhaust tract of the internal combustion engine, the delivery power of the fuel delivery pump is increased in relation to normal operation such that the required fuel quantity is provided at the inlet of the exhaust-tract dosing apparatus. Through operation of the exhaust-tract dosing apparatus, the desired or required quantity of fuel is injected into the exhaust tract.

Since the pressure required for correct operation at the exhaust-tract dosing apparatus is generally higher than the pressure that must prevail for correct operation at the engine injection apparatus, a reliable regeneration of the diesel particle filter is ensured by means of a temporary pressure increase during the regeneration process. The pressure increase is realized by means of an increase in the delivery quantity of the fuel delivery pump. Here, the delivery quantity of the fuel delivery pump may in particular be increased to its maximum possible value. The fluid throttle makes it possible for the pressure that prevails at the exhaust-tract dosing apparatus to be increased beyond the pressure that prevails at the engine injection apparatus.

By virtue of the pressure at the exhaust-tract dosing apparatus being reduced again, through reduction of the delivery quantity of the fuel delivery pump, after the ending of the regeneration process, efficient operation of the internal combustion engine can be realized.

In one embodiment, the inlet of an overflow valve is connected to the second fluid port. The outlet of the overflow valve is connected via an overflow line to the tank. It is thus possible, through opening of the overflow valve, for excess fuel to be discharged and in particular returned into the tank. Here, the overflow valve acts as a pressure control valve, and makes it possible for the pressure that prevails at the inlet of the engine injection apparatus to be set to a desired value. It is thus possible in particular to prevent the pressure that prevails at the inlet of the engine injection apparatus from fluctuating too intensely about a predefined value that is required for the correct functioning of the engine injection apparatus, or exceeding a predefined threshold value.

In particular, the overflow valve comprises a spring-piston element which is designed such that the overflow valve has a steep characteristic curve at a predefined operating point. In particular, an overflow valve throttle element is provided at the outlet of the overflow valve. By means of the special construction of the overflow valve with a spring-piston element and a throttle element, which is arranged downstream of the overflow valve, the pressure in the overflow line can be controlled and/or limited.

In one embodiment, the overflow valve is formed, at the inlet side, with an overflow valve filter element. By means of a filter element which is arranged upstream of the overflow valve, a blockage of the overflow valve by foreign bodies and/or contaminants can be reliably prevented.

In one embodiment, a fuel filter is provided between the outlet of the fuel delivery pump and the first fluid port and/or between the outlet of the fuel delivery pump and the fluid throttle, in order to prevent blockage of or damage to the exhaust-tract dosing apparatus or the engine injection apparatus by foreign bodies and/or contaminants.

The filter element, the overflow valve and the overflow valve throttle element may be formed as constituent parts of the fuel supply device or within the engine injection apparatus.

In one embodiment, the fuel delivery pump is formed as a controllable pump, in particular as a pump which is controllable in continuously variable and/or electronic fashion, such that the delivered fuel quantity and thus also the fluid pressure at the outlet of the pump can be easily set to a desired value.

BRIEF DESCRIPTION OF THE DRAWINGS

An exemplary embodiment of the invention will be discussed in more detail below on the basis of the appended figures, in which.

DETAILED DESCRIPTION

Figure 1:
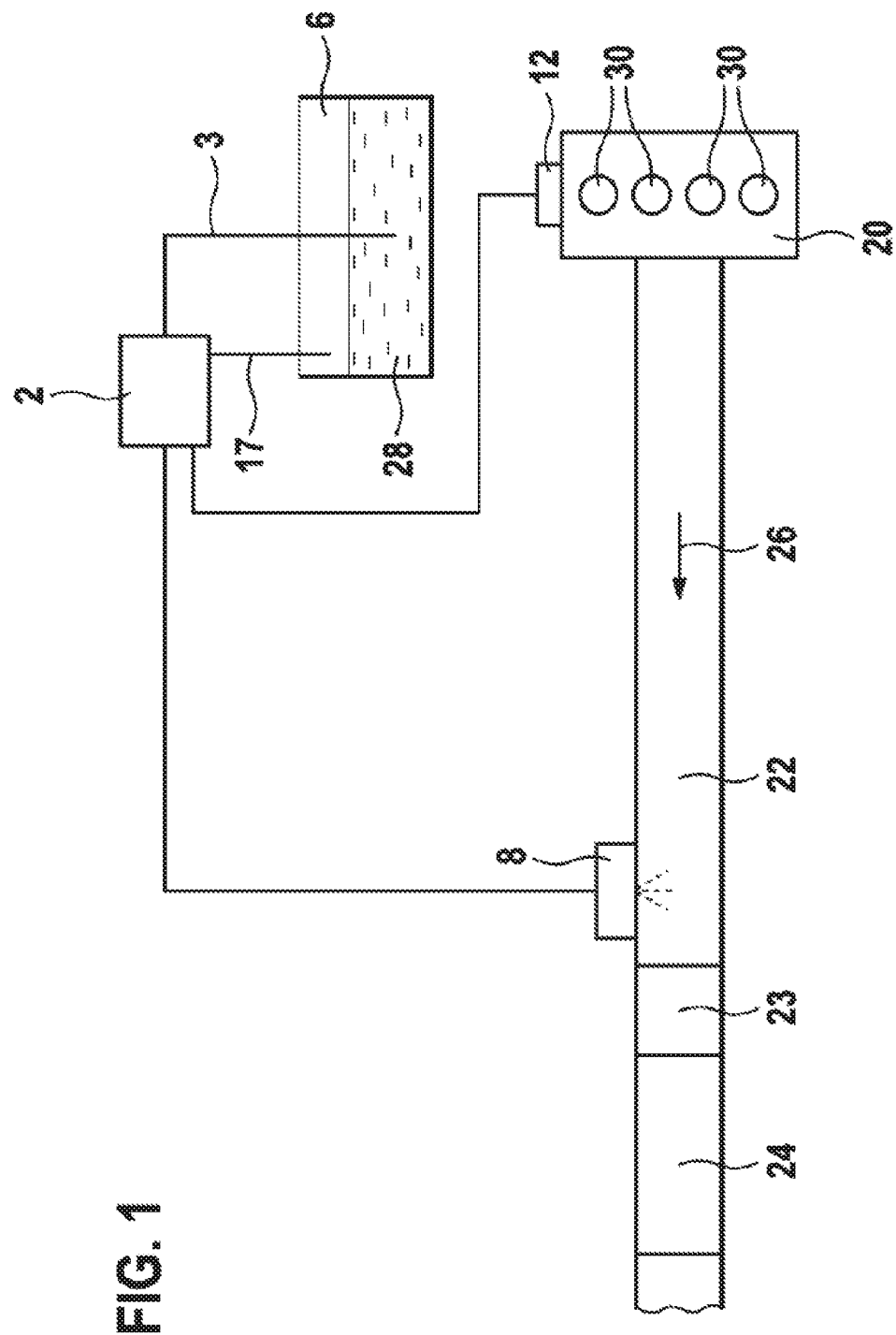
FIG. 1 is a schematic illustration of a system for injecting fuel into an exhaust tract of an internal combustion engine.

FIG. 1 shows a system for injecting fuel into an exhaust tract 22 of an internal combustion engine 20 in a schematic illustration.

An exhaust-tract dosing apparatus 8 is mounted on the exhaust tract 22 between the internal combustion engine 20 and a particle filter 24 arranged downstream of the internal combustion engine 20. By means of a fuel supply device 2, fuel 28 is extracted from a fuel tank 6 via a fuel line 3 and is fed to the exhaust-tract dosing apparatus 8.

The exhaust-tract dosing apparatus 8 is designed to inject a desired fuel quantity into the exhaust tract 22. In the exhaust tract 22, the injected fuel 28 mixes with the exhaust gases 26 flowing through the exhaust tract 22 and ignites, in particular on an oxidation catalytic converter 23 arranged between the exhaust-tract dosing apparatus 8 and the particle filter 24.

The high temperatures that arise in the exhaust tract 22 during the combustion of the injected fuel 28 cause particles, in particular soot particles, that have previously collected in the particle filter 24 to be burned off, and the particle filter 24 to be regenerated.

The fuel supply device 2 also supplies fuel 28 to an engine injection apparatus 12. The fuel 28 is injected by the engine injection apparatus 12 into the combustion chambers ("cylinders") 30 of the engine 20.

The fuel supply device 2 also comprises a fuel return line 17 which allows excess fuel 28 to be returned into the fuel tank 6.

The construction and function of the fuel supply device 2 will be discussed in more detail below on the basis of the enlarged illustration shown in FIG. 2.

The fuel supply device 2 comprises a fuel delivery pump 4, which is designed to extract fuel 28 from the fuel tank 6 through the fuel line 3 and to feed said fuel at elevated pressure to a first fluid port 7 through a pressure line 5, in which a fuel filter 9 is arranged. The first fluid port 7 is provided for the connection of the exhaust-tract dosing apparatus 8.

Via a fluid throttle 16, the pressure line 5 is also connected to a second fluid port 10, which is provided for the connection of an engine injection apparatus 12.

Downstream of the fluid throttle 16, that is to say on that side of the fluid throttle 16 which is averted from the pressure line 5, there is situated an overflow valve 14, which is connected at the outlet side to the fuel return line 17. By virtue of the overflow valve 14 being opened, excess fuel 28 can be returned into the fuel tank 6.

The overflow valve 14 is formed, at the inlet side, with an overflow valve filter element 13 and/or, at the outlet side, with an overflow valve throttle element 15. By means of a filter element 13 which is arranged upstream of the overflow valve 14, a blockage of the overflow valve 14 by foreign bodies and/or contaminants can be reliably prevented.

The overflow valve 14 comprises in particular a spring-piston element 14a, which is designed such that the overflow valve 14 has a steep characteristic curve at a predefined operating point. By means of the construction of the overflow valve 14 with a spring-piston element 14a and with an overflow valve throttle element 15 which is arranged downstream of the overflow valve 14, the pressure that prevails at the second fluid port 10 can be controlled and/or limited.

Figure 2:
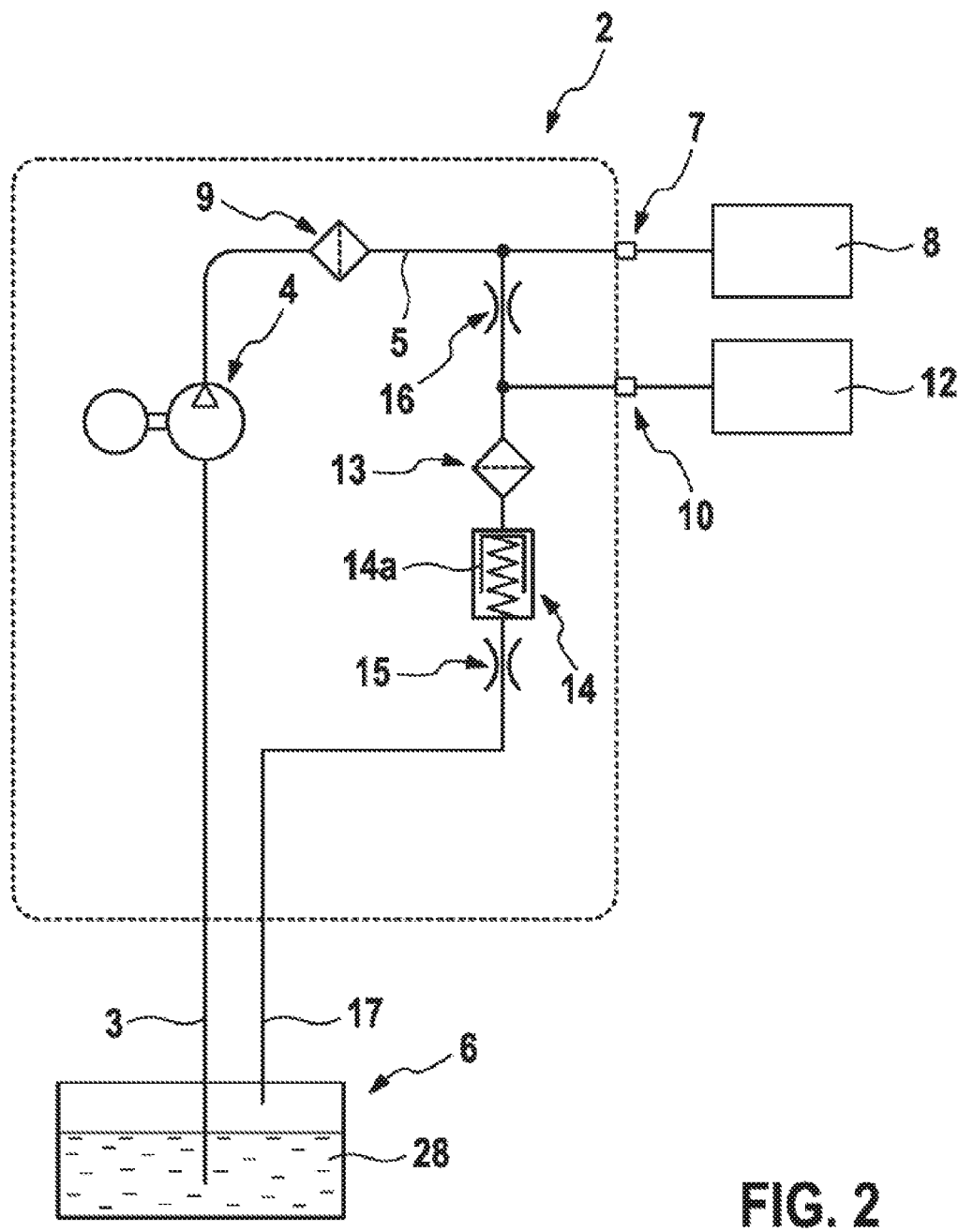
FIG. 2 is a schematic illustration of a fuel supply device according to an exemplary embodiment of the invention.

The filter element 13, the overflow valve 14 and the overflow valve throttle element 15 are, in FIG. 2, illustrated as constituent parts of the fuel supply device 2. Alternatively, the filter element 13, the overflow valve 14 and the overflow valve throttle element 15 may also be formed within the engine injection apparatus 12.

During the normal operation of the internal combustion engine 20, when no regeneration of the particle filter 24 is taking place, the exhaust-tract dosing apparatus 8 connected to the first fluid port 7 is deactivated. During normal operation, the delivery quantity of the fuel delivery pump 4 is set such that the provided fuel quantity is sufficient to set the desired or required fuel pressure at the inlet of the engine injection apparatus 12, which is connected to the second fluid port 10, by means of the interaction of the overflow valve 14 and the overflow valve throttle element 15.

For effective operation of the internal combustion engine 20 and of the fuel supply device 2, the delivery quantity of the fuel delivery pump 4 is in particular set such that the fuel quantity provided by the fuel supply device 2 at the second fluid port 10 is not significantly greater than the quantity of fuel 28 injected by the engine injection apparatus 12 into the combustion chambers 30 of the engine 20.

To maintain a constant pressure at the inlet of the engine injection apparatus 12 and to prevent excessive pressure fluctuations, the fuel quantity provided at the second fluid port 10 must be slightly greater than the fuel quantity injected into the combustion chambers 30 of the engine 20. A part of the fuel is also required for the cooling of the engine injection apparatus 12. Excess fuel 28 that is not required by the engine injection apparatus 12 is returned into the fuel tank 6 through the opened overflow valve 14 and the fuel return line 17.

To regenerate the particle filter 24 (regeneration operation), the delivery power of the fuel delivery pump 4 is increased, and the exhaust-tract dosing apparatus 8 connected to the first fluid port 7 is activated in order to inject the desired/required quantity of fuel 28 into the exhaust tract 22.

The fluid throttle 16 makes it possible to set a higher pressure at the inlet of the exhaust-tract dosing apparatus 8 connected to the first fluid port 7 than at the engine injection apparatus 12 connected to the second fluid port 10. In this way, the exhaust-tract dosing apparatus 8 can be operated reliably without the need for the engine injection apparatus 12 to be operated with an excessively high fuel pressure. The fuel pressure prevailing at the first fluid port 7 may for example amount to 4.4 to 8.9 bar, and the fuel pressure prevailing at the second fluid port may for example amount to between 3.5 and 4.0 bar, in particular 3.8 bar.

Figure 3:
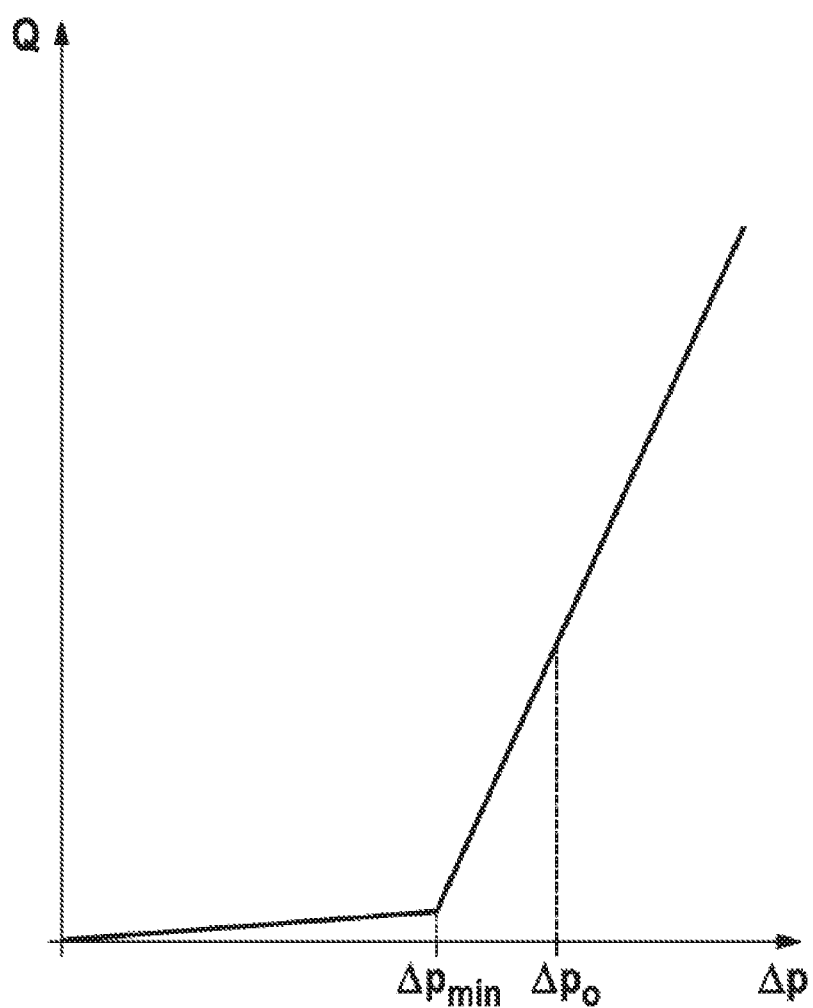
FIG. 3 schematically shows an example of a characteristic curve of an overflow valve as is used in a fuel supply device according to an exemplary embodiment of the invention.

FIG. 3 shows a characteristic curve of the overflow valve 14 in a schematic illustration.

Here, the pressure difference $\Delta p$ between the inlet and the outlet of the overflow valve 14 is plotted on the horizontal axis (x axis). The throughflow quantity $\Delta Q$ through the overflow valve 14 is plotted on the vertical axis (y axis).

For small pressure differences $\Delta p < \Delta p_{min}$, the overflow valve 14 has a very shallow characteristic curve, such that the overflow valve 14 is practically closed in said range. In the range $\Delta p > \Delta p_{min}$, the overflow valve 14 has a very steep characteristic curve of for example 400 l/h/bar. The operating point $\Delta p_O$ of the engine injection apparatus 12, which lies for example between 3.5 and 4.0 bar, in particular at 3.8 bar, is situated in the steep region of the characteristic curve. In this way, pressure fluctuations are absorbed by the overflow valve 14, and a highly constant pressure around the operating point $\Delta p_O$ is provided at the inlet of the engine injection apparatus 12, which is connected to the second fluid port 10 of the fuel supply device 2.

The overflow valve 14 makes it possible for the pressure at the second fluid port 10 or at the engine injection apparatus 12 to remain virtually constant about a predefined target value (operating point $\Delta p_O$) that permits correct functioning of the engine injection apparatus 12.

The fluid throttle 16 makes it possible for fuel at elevated pressure to be provided at the first fluid port 7, or at the exhaust-tract dosing apparatus 8, without the pressure at the second fluid port 10 exceeding the predefined target value.

The invention thus makes it possible for an exhaust-tract dosing apparatus 8 and an engine injection apparatus 12 to be operated reliably on a common fuel supply device 2. It is thus possible to dispense with an additional fuel supply device 2 for supplying the exhaust-tract dosing apparatus 8. In this way, the production outlay and the production costs can be considerably reduced.

The invention claimed is:

1. A fuel supply device (2) comprising
a controllable fuel delivery pump (4), which is configured to extract fuel (28) from a fuel tank (6) and to output said fuel at elevated pressure through an outlet,
a first fluid port (7), which is configured for the connection of an exhaust-tract dosing apparatus (8), and
a second fluid port (10), which is configured for the connection of an engine injection apparatus (12),
wherein the first fluid port (7) is connected directly or via a fuel filter (9) to the outlet of the fuel delivery pump (4),
wherein a fluid throttle (16) is arranged between the outlet of the fuel delivery pump (4) and the second fluid port (10), and
wherein the fuel supply device (2) is configured to,
during normal operation, set the delivery quantity of the controllable fuel delivery pump (4) such that a provided fuel quantity is sufficient to provide, at the second fluid port (10), a fuel quantity required by the engine injection apparatus (12), and
in response to a regeneration operation, increase a delivery power of the fuel delivery pump (4) and activate the exhaust-tract dosing apparatus (8) connected to the first fluid port (7), in order to inject fuel into the exhaust tract (22).

2. The fuel supply device (2) as claimed in claim 1, wherein the inlet of an overflow valve (14) is connected to the second fluid port (10), which overflow valve allows excess fuel to be returned into the fuel tank (6).

3. The fuel supply device (2) as claimed in claim 2, wherein the overflow valve (14) is formed, at an inlet side, with an overflow valve filter element (13) or, at an outlet side, with an overflow valve throttle element (15).

4. The fuel supply device (2) as claimed in claim 1, wherein a fuel filter (9) is provided between the outlet of the fuel delivery pump (4) and the first fluid port (7) or between the outlet of the fuel delivery pump (4) and the fluid throttle (16).

5. The fuel supply device (2) as claimed in claim 1, wherein the fuel delivery pump (4) is controllable in continuously variable or electronic fashion.

6. A method for regenerating a particle filter (24) which is arranged in an exhaust tract (22) of an internal combustion engine (20) having a fuel supply device (2) as claimed in claim 1, and the exhaust-tract dosing apparatus (8) which is connected to the first fluid port (7) and which is configured to inject fuel (28), which is provided by the fuel supply device (2), upstream of the particle filter (24) in the exhaust tract (22) of the internal combustion engine (20), wherein the method comprises:
(a) increasing a delivery power of the fuel delivery pump (4); and
(b) injecting a desired quantity of fuel (28) into the exhaust tract (22) by operating the exhaust-tract dosing apparatus (8).

7. The method as claimed in claim 6, wherein the method comprises operating the fuel delivery pump (4) with a maximum power.

8. A method for operating an internal combustion engine (20) having a fuel supply device (2) as claimed in claim 1, and an engine injection apparatus (12) which is connected to the second fluid port (10) and which is configured to inject fuel (28) into at least one combustion chamber (30) of the internal combustion engine (20), wherein the method comprises:
setting a delivery quantity of the fuel delivery pump (4) such that the engine injection apparatus (12) is provided with a sufficient fuel quantity.

9. The method as claimed in claim 8, wherein the method comprises setting the delivery quantity of the fuel delivery pump (4) such that the engine injection apparatus (12) is provided with a fuel quantity which is greater than a fuel quantity required by the engine injection apparatus (12).

10. The method as claimed in claim 8, wherein the method comprises discharging excess fuel (28) by opening an overflow valve (14) upstream of the engine injection apparatus (12).

* * * * *